US010495484B2

(12) United States Patent
Ausserlechner

(10) Patent No.: US 10,495,484 B2
(45) Date of Patent: Dec. 3, 2019

(54) MAGNET ARRANGEMENT AND SENSOR DEVICE

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 225 days.

(21) Appl. No.: 15/421,034

(22) Filed: Jan. 31, 2017

(65) Prior Publication Data
US 2017/0241802 A1  Aug. 24, 2017

(30) Foreign Application Priority Data

Feb. 18, 2016 (DE) .................. 10 2016 102 828

(51) Int. Cl.
*G01D 5/14* (2006.01)
*H01F 1/00* (2006.01)
*H01F 1/10* (2006.01)
*H01F 13/00* (2006.01)
*H01F 41/02* (2006.01)
*H01F 7/02* (2006.01)

(52) U.S. Cl.
CPC .............. *G01D 5/14* (2013.01); *H01F 1/0036* (2013.01); *H01F 1/10* (2013.01); *H01F 7/0294* (2013.01); *H01F 13/003* (2013.01); *H01F 41/0293* (2013.01); *H01F 41/0266* (2013.01)

(58) Field of Classification Search
CPC ........ G01N 27/04; G01N 27/02; G01N 27/06; G01N 33/18; G01N 27/045

USPC ................. 324/693, 600, 649, 691
See application file for complete search history.

(56) References Cited

U.S. PATENT DOCUMENTS

| 4,737,774 A * | 4/1988 | Chapman ............... G01D 5/145 340/573.1 |
| 6,211,668 B1 | 4/2001 | Duesler et al. |
| 6,288,533 B1 | 9/2001 | Haeberli et al. |
| 2005/0253578 A1 | 11/2005 | Kawashima et al. |
| 2006/0028203 A1 | 2/2006 | Kawashima et al. |
| 2009/0033315 A1 | 2/2009 | Kawashima et al. |
| 2010/0118447 A1 | 5/2010 | Hammerschmidt et al. |
| 2012/0105057 A1 | 5/2012 | Mol |
| 2012/0176126 A1 | 7/2012 | Naganuma et al. |
| 2015/0137796 A1 | 5/2015 | Ausserlechner |
| 2015/0142376 A1 | 5/2015 | Ausserlechner |
| 2015/0145524 A1 * | 5/2015 | Duncan ............... G01R 31/024 324/538 |
| 2015/0276893 A1 | 10/2015 | Kaufmann et al. |
| 2015/0355291 A1 | 12/2015 | Elian et al. |

(Continued)

FOREIGN PATENT DOCUMENTS

| CN | 102472636 | 5/2012 |
| CN | 104583727 | 4/2015 |

(Continued)

*Primary Examiner* — Giovanni Astacio-Oquendo
(74) *Attorney, Agent, or Firm* — Harrity & Harrity, LLP

(57) ABSTRACT

Magnet arrangements, sensor devices and corresponding methods are provided comprising a first magnet portion and a second magnet portion. The first magnet portion is spaced apart from the second magnet portion, and the second magnet portion comprises a bore. In a corresponding sensor device, a sensor element may be provided at a position between the first and second magnet portions.

25 Claims, 5 Drawing Sheets

(56) References Cited

U.S. PATENT DOCUMENTS

| | | | |
|---|---|---|---|
| 2016/0054370 A1* | 2/2016 | Fomin | G01R 31/025 |
| | | | 324/509 |
| 2016/0178689 A1* | 6/2016 | Okita | G01R 31/024 |
| | | | 324/509 |
| 2016/0178714 A1* | 6/2016 | Fautz | G01R 33/483 |
| | | | 324/309 |
| 2016/0233734 A1* | 8/2016 | Biwersi | H02K 1/146 |
| 2017/0319097 A1* | 11/2017 | Amthor | A61B 5/055 |
| 2018/0024214 A1* | 1/2018 | Bhat | G01R 33/4828 |
| | | | 324/309 |

FOREIGN PATENT DOCUMENTS

| | | |
|---|---|---|
| DE | 19958504 A1 | 6/2001 |
| DE | 10 2006 020700 A1 | 11/2007 |
| EP | 0 733 881 A2 | 9/1996 |
| EP | 0907068 | 5/2004 |

* cited by examiner

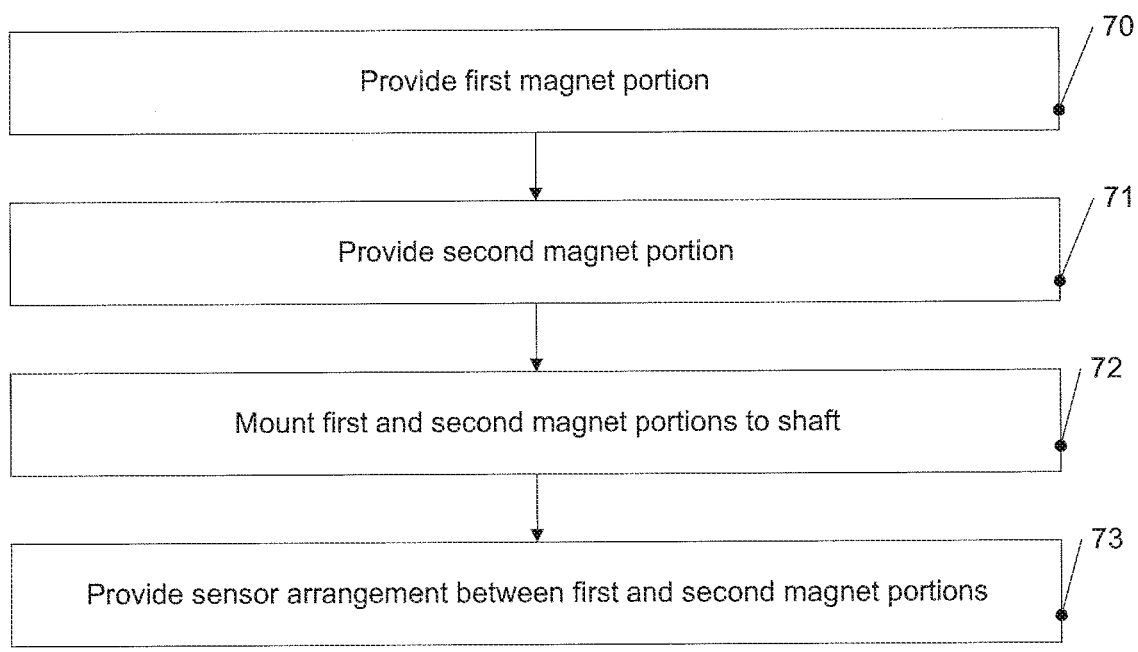

MAGNET ARRANGEMENT AND SENSOR DEVICE

RELATED APPLICATION

This application claims priority under 35 U.S.C. § 119 to German Patent Application No. 102016102828.2, filed on Feb. 18, 2016, the content of which is incorporated by reference herein in its entirety.

TECHNICAL FIELD

The present application relates to magnet arrangements for sensor devices and to sensor devices including such magnet arrangements as well as to corresponding methods.

BACKGROUND

Magnet-based sensor devices are frequently used to detect movements and/or positions. In general, for such devices, a magnet arrangement is mounted to a first part of a device, and a magnetic field sensor arrangement is mounted to a second part of the device, the first part being moveable with respect to the second part. When the first part moves relative to the second part, the magnetic field sensed by the sensor arrangement changes, thus enabling a detection of movement and/or position.

One type of such sensors are angular magnetic sensors, which sense for example an angular position or a rotational speed. In such devices, for example a magnet arrangement may be mounted to a rotating shaft, and a sensor arrangement which is stationary with respect to the rotating shaft senses changes of the magnetic field when the shaft rotates. Such devices may e.g. be used in the automotive field to determine angular position and/or rotational speed of various components of an automobile.

One type of such sensors uses magnetoresistive sensor elements, which respond to a magnetic field components in a plane perpendicular to the rotation axis of the shaft. Several types of magnetoresistive sensor elements are known, which may be based on anisotropic magnetoresistive effect (AMR), giant magnetoresistive effect (GMR), colossal magnetoresistive effect (CMR) or tunneling magnetoresistive effect (TMR). Instead of magnetoresistive sensor elements in some cases also vertical Hall devices may be used which also detect magnetic field components perpendicular to the rotation axis. Such sensor devices have the disadvantages that they are quite sensitive to magnetic disturbances (e.g. stray fields). Their advantage is that they are comparatively insensitive to manufacturing tolerances, in particular tolerances as regards the positioning of various components.

This type of magnetic sensor device may be referred to as perpendicular magnetic angle sensor herein.

Another type of angular magnetic sensor devices uses a couple of Hall plates (e.g. at least three) arranged on a plane perpendicular to the rotation axis of a shaft to which a magnet arrangement is mounted. Such Hall plates are for example positioned around a center where the rotation axis intersects the plane on which the Hall plates are arranged. The Hall plates generally are sensitive to a magnetic field in a direction parallel to the rotation axis. When the magnet rotates, the signals of the different Hall plates are e.g. combined in such a way to extract the slope of the vertical magnetic field component parallel to the direction of the rotation axis in one or more, preferably at least, orthogonal directions. These devices therefore operate as vector gradiometers, detecting gradients of the magnetic field in two directions. This type of magnetic sensor device may be referred to as axial magnetic angle sensor herein, because they primarily detect axial magnetic field components.

Such axial magnetic angle sensors are generally more robust against magnetic disturbances as the previously explained perpendicular magnetic angle sensors. On the other hand, they tend to be sensitive to small assembly tolerances of the device, such that for example a slight lateral misalignment between magnetic arrangement and sensor arrangement may cause comparatively large errors in measured angles.

While some optimized magnet arrangement to reduce sensitivity to assembly tolerances had been discussed previously in the art, conventional solutions for optimized magnets may have drawbacks like small magnetic fields, which reduce the sensed signal.

It is therefore an object to provide possibilities to provide improved magnet arrangements and magnetic angle sensor devices, in particular devices which are less susceptible to assembly tolerances and still apply large magnetic fields on the sensor elements.

SUMMARY

A magnet arrangement as defined in claim 1 is provided. Furthermore, a method as defined in claim 22 is provided. The dependent claims define further embodiments of the magnet arrangement and the method as well as a sensor device comprising such a magnet arrangement.

BRIEF DESCRIPTION OF DRAWINGS

FIG. 7 is flow chart illustrating a method according to an embodiment.

DETAILED DESCRIPTION

In the following, various embodiments will be described in detail referring to the attached drawings. These embodiments are given for explanatory purposes only and are not to be construed as limiting. For example, describing an embodiment with a plurality of features or components is not to be construed as indicating that all these features or components are necessary for implementing an embodiment. Instead, other embodiments may include less features or components than the ones explicitly shown and described and/or may comprise alternative features or components. Furthermore, in addition to the features or components explicitly shown and described, other features or components, for example features and components conventionally used in angular magnetic sensor devices, may be provided.

Features from different embodiments may be combined unless noted otherwise. Modifications and evaluation described with respect to one of the embodiments may also be applicable to other embodiments.

Figure 1:
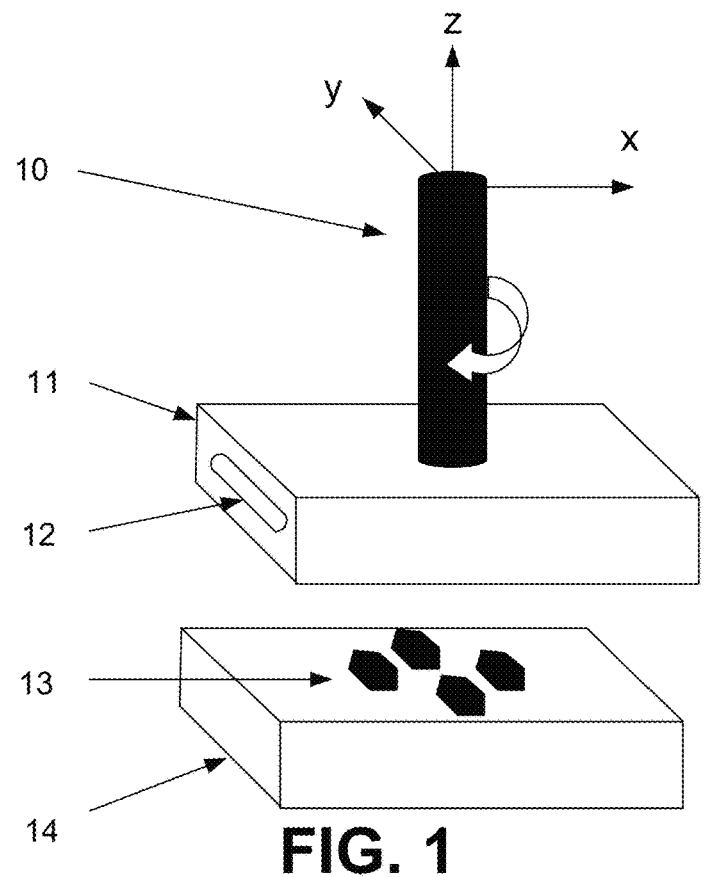
FIG. 1 is a schematic explanatory view of an example environment where embodiments may be implemented.

Turning now to the Figures, FIG. 1 shows an example sensor device where magnet arrangements according to embodiments as described later may be employed. The sensor device of FIG. 1 is of the axial magnetic angle sensor type mentioned in the background portion. However, magnet arrangements as discussed below may also be applied to other sensor types, for example perpendicular magnetic angle sensors as described in the background portion.

In the axial angle sensor illustrated in FIG. 1, four sensor elements 13 are arranged on a chip die 14. The sensor elements 13 in the example shown are Hall plates which are sensitive to a magnetic field in the z-direction indicated in FIG. 1, while being arranged in the x/y plane essentially on a circle concentric to the rotation axis, which is called the reading circle. Typically, each sensor element 13 may comprise more that one Hallo plate or other sensor unit, e.g. four sensor units (also referred to as quadruple). The reading circle typically has a diameter of 1.5 mm, although other values are also possible. A magnet 11 is mounted to a shaft 10 and rotates together with shaft 10. The rotation axis is parallel to the z-direction. Magnet 11 is magnetized in a direction in the X/Y plane as indicated by an arrow 12. Such a magnetization is also referred to as a diametrical magnetization. In FIG. 1 the magnet may have a length in x- and y-direction of about 6 mm, a thickness in z-direction of about 3 mm, and the axial distance between sensor elements and magnet may be also about 3 mm. The reading circle has a typical diameter of 1.5 mm. Other values may also be used.

In a counterclockwise direction, magnetic fields measured along the reading circle by the four sensor elements 13 may be designated $h_1$, $h_2$, $h_3$ and $h_4$. In order to determine a rotation angle in the sensor device of FIG. 1, an evaluation device, for example a correspondingly programmed microprocessor or dedicated hardware like an application specific integrated circuit (ASIC), may compute $h_{13}=h_1-h_3$ and $h_{24}=h_2-h_4$, i.e. differences between magnetic fields measured at opposite sensors. The rotation angle may then be derived as the arcus tangent of the ratio of $h_{13}/h_{24}$, i.e. $\alpha=\arctan(h_{13}/h_{24})$, wherein a is the rotation angle. In some implementations, instead of Hall plates magnet field sensing field effect transistors (MAGFETs) may be used, which are also sensitive to magnetic fields in the z-direction.

In the following, the magnetic field in the z-direction will also be designated Bz.

As mentioned above, a system as shown in FIG. 1 is comparatively sensitive to small assembly tolerances. Therefore, in the following, embodiments of magnet arrangements will be discussed which may be used as magnet 11 in FIG. 1 which reduce the sensitivity to assembly tolerances. While these magnet arrangements will be primarily discussed for an axial magnetic angle sensor as illustrated in FIG. 1, as mentioned above the magnet arrangements may also be used for other magnetic angle sensors.

In some embodiments, to reduce sensitivity to assembly tolerances the magnet arrangement is designed such that the first and second derivatives of the Bz-field against the z-position are small (at zero or close to zero) at the nominal position of the sensor elements (like sensor elements 13 of FIG. 1). If the position of the sensor element in z-direction is eps_z the two equations:

$$dBz(x=0,y0,z=eps\_z)/dz=0 \quad (1)$$

and $$d^2Bz(x=0,y0,z=eps\_z)/dz^2=0 \quad (2)$$

should be fulfilled quite well (the larger the deviations of the derivatives from zero become, the larger the sensitivity to assembly tolerances may become, although some sensitivity may be acceptable). In equations (1) and (2) it is assumed that the sensor element is at a position x=0, y=y0 and z=eps_z and the magnet has a diametrical magnetization in y-direction. y0 corresponds to half the reading circle diameter, 1.5 mm in the above numerical example.

In other words, as expressed by equations (1) and (2) the Bz(z) should exhibit a flat plateau with zero slope and zero curvature at the sensor position.

Figure 2A:
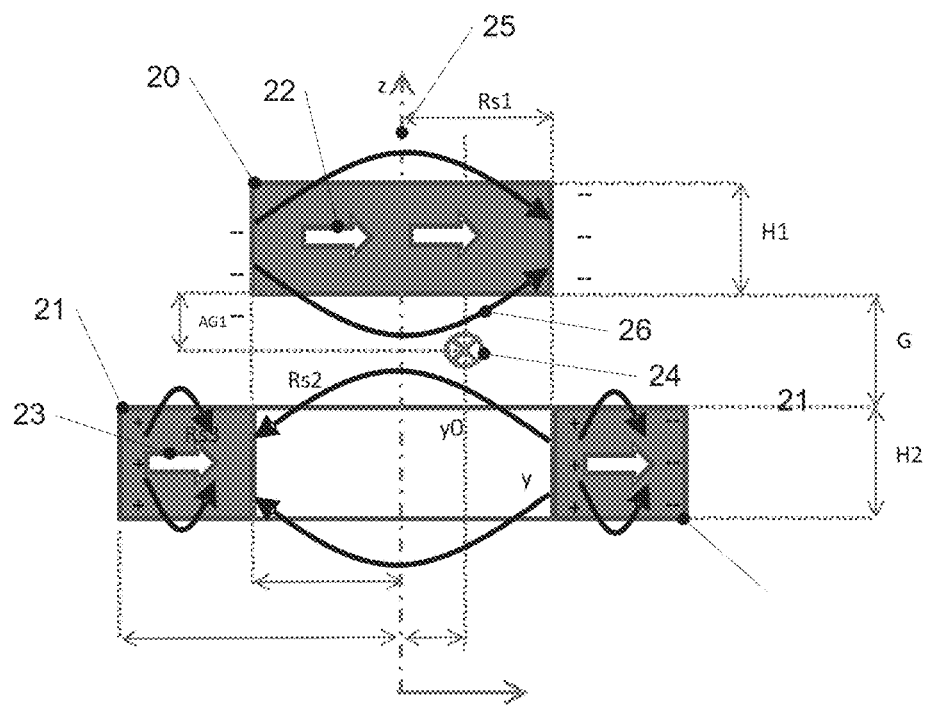
FIG. 2A is a cross-sectional view of a magnet arrangement according to an embodiment.

In FIG. 2A a magnet arrangement according to an embodiment is shown which generates such a Bz(z) pattern at least in good approximation. The magnet arrangement illustrated in FIG. 2A comprises a first magnet 20 corresponding to a first magnet portion and a second magnet 21 corresponding to a second magnet portion. First magnet 20 in the embodiment of FIG. 2A is pill- or tablet shaped, whereas second magnet 21 has a ring shape. Other shapes are also possible, some of which will be explained further below. Magnets 20, 21 are arranged in a concentric manner about a rotation axis 25, which in the illustration of FIG. 2A corresponds to the z-axis. First magnet 20 and second magnet 21 are spaced apart by a distance G. A height of first magnet 20 in the z-direction is labelled H1, and a height of second magnet 21 in the z-direction is labelled H2. A radius of first magnet 20 is labelled Rs1. An inner radius of second magnet 21 is labelled Rs2, and an outer radius is labelled Rs3. Magnets 20, 21 are magnetized in the same direction (y-direction in FIG. 2), as indicated by arrows 22, 23. With plus and minus, magnetic "charges" are illustrated, corresponding to north and south poles. Solid arrows 26 illustrate magnetic field lines. Magnets 20, 21 are therefore magnetized in diametrical y-direction.

Numeral 24 indicates an example sensor position at y=y0. Sensor position 24 has a distance AG1 from first magnet 20 and therefore a distance of G-AG1 from second magnet 21. As can be seen by the magnetic field lines shown by arrows 26, at the sensor position 24 the magnetic field contribution Bz in z-direction is positive, and the contribution from second magnet 21 is also positive. When the sensor position 24 is shifted towards first magnet 20 (i.e. AG1 decreases), the magnitude of the Bz contribution generated by first magnet 20 grows, whereas the Bz contribution from second magnet 21 decreases. The opposite happens when sensor position 24 approaches second magnet 21, i.e. AG1 increases. By designing the dimension of magnets 20, 21 accordingly, an essentially constant Bz around sensor position 24 may be obtained. Therefore, the requirements of the above equations (1) and (2) may be at least approximately fulfilled.

In some embodiments, to obtain suitable magnets, both magnets 20, 21 may be made of the same material, although in other embodiments the materials may be different. Suitable materials include sintered, pressed or injection molded magnetic materials. Magnet 20 and/or 21 may be made for example of hard ferrite, AlNiCo or rare earth materials like NdFeB, SmCo or $Sm_2Co_5$, but are not limited thereto. Materials may be isotropic or anisotropic. Anisotropic materials may be dry-pressed or wet-pressed materials. In some embodiments, H1 may be substantially equal to H2, and Rs1 may be substantially equal to Rs2. "Approximately equal" or "substantially equal" herein may indicate that the dimensions are equal with a tolerance±20%, ±15%, ±10% or ±5%. Rs3 may be larger than Rs2 by at least 20%, at least 30%, at least 40% or at least 50%. Generally, Rs3 may be larger than Rs2 by an amount sufficient to generate magnetic fields as desired. A suitable value for Rs3 for a given Rs2 may for example be found an optimization process where the value of Rs3 is varied.

In embodiments, in this case as can be seen in FIG. 2A, for Rs1=Rs2 a distance from north poles at radius Rs1 of first magnet 20 to sensor position 24 is approximately equal to the distance of south poles (i.e. at radius Rs2) of second magnet 21 to sensor position 24, and a distance of south poles at an outer surface of first magnet 20 to sensor position 24 is approximately equal to a distance of an inner south pole of second magnet 21 to sensor position 24. Therefore, in the embodiment of FIG. 2A at sensor position 24 where AG1=G/2 the magnetic charges of first magnet 20 on Rs1 contribute essentially 50% of field Bz and the magnetic charges of second magnet 21 on Rs2 contribute also essentially 50% of field Bz. If the sensor or the magnet is shifted in axial direction due to assembly tolerances or axial play of the bearings of the shaft, the contribution of charges of first magnet 20 on Rs1 (or of second magnet 21 on Rs2) increases linearly with shift, while the contribution of charges of second magnet 21 on Rs2 (or of first magnet 20 on Rs1) decrease linearly with shift, so that the total field remains essentially constant versus small shifts. This produces a flat plateau of Bz(z) near the sensor position 24 in the middle between both magnets.

If Rs3 is much larger than Rs1 and Rs2, the magnetic charges at the outer diameter (on Rs3) of second magnet 21 are much more distant from sensor location 24 than the magnetic charges on the surfaces of first and second magnets 20, 21 at radial distance Rs1 and Rs2, respectively, and therefore the contribution of the magnetic charges at radial distance Rs3 is negligible in such embodiments.

If Rs3 is not so large (e.g. not significantly larger than Rs2) that one can neglect the contribution of its magnetic charges to the total field at the sensor location 24 entirely, the influence of these charges may be taken into account as follows: Magnetic charges of second magnet 21 on Rs3 to some extent counteract the charges of second magnet 21 on Rs2 (as they have opposite signs), thereby slightly reducing the field contribution at sensor location 24 of the second magnet portion compared to the field contribution of the first magnet portion if both magnet portions have equal Rs1=Rs2, H1=H2 and AG1=G/2.

Therefore, one can account for charges on Rs3 by shifting the nominal sensor position slightly towards second magnet 21, and/or by slightly reducing Rs2 compared to Rs1 so that e.g. Rs2=0.85 . . . 1*Rs1 (because then the charges on Rs2 are slightly nearer to sensor location 24 than charges on Rs1), and/or by slightly increasing the height H2 against H1 so that e.g. H2=1 . . . 1.3*H1 (because then the larger height H2 compensates for the loss in magnetic field due to the magnetic charges on Rs3), and/or by making a central stud-hole into first magnet portion facing the sensor element or by making a central through-hole into first magnet 20 (because then the magnetic charges in the bore surface weaken the field at the sensor location 24 generated by the magnetic charges at the outer diameter Rs3 of second magnet 21).

Figure 2B:
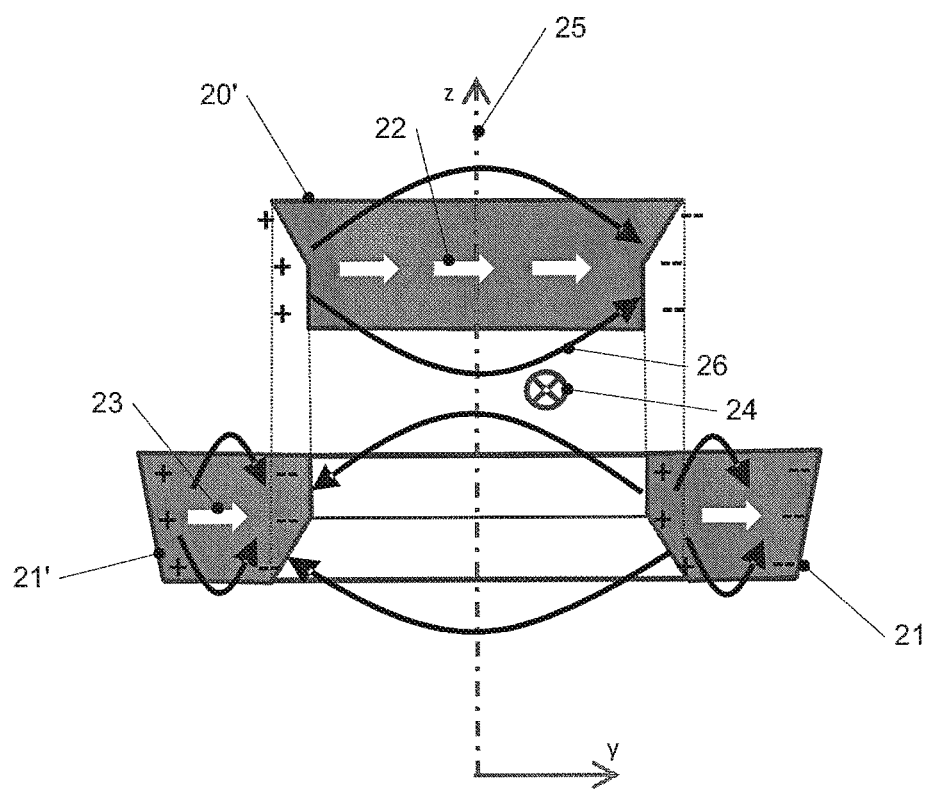
FIG. 2B is a cross-sectional view of a modification of the embodiment of FIG. 2A.

While in FIG. 2A specific magnet shapes are shown, in other embodiments other shapes may be used. FIG. 2B shows an example with alternative magnet shapes. In FIG. 2B, instead of magnets 20, 21 of FIG. 2A magnets 20', 21' are provided, which differ from magnets 20, 21 regarding their form. Otherwise, the embodiment of FIG. 2B corresponds to the embodiment of FIG. 2A, and the explanations given above for FIG. 2A also applied to FIG. 2B.

In FIG. 2A, the outer sidewall of first magnet 20' has a truncated cone shape in an upper part thereof and a cylindrical shape in a lower part thereof. An inner sidewall of second magnet 21' has a cylindrical shape in an upper part thereof an a truncated cone shape in a lower part thereof. An outer sidewall of second magnet 21' has a truncated cone shape. Other shapes are also possible.

In embodiments, for example in FIG. 2A and FIG. 2B, the shape of a first magnet portion (e.g. first magnet 20 or 20') corresponds to a shape of a central bore of a second magnet portion (e.g. second magnet 21 or 21') and is arranged mirrored (symmetric) with respect to a plane perpendicular to the axis of rotation (z-axis) between the two magnet portions (i.e. at G/2). For example, in FIG. 2B first magnet 20' is mirror-symmetric to the central bore of second magnet 21' with respect to a plane perpendicular to axis 25 at G/2.

In use, the magnet arrangement of FIG. 2A or 2B is rotated about axis 25, for example by being coupled to a rotating shaft as will be explained below. Regardless of the specific shape, a center of first magnet 20 or 20' and a center of second magnet 21 or 21' is essentially on the axis 25. Essentially may mean apart from manufacturing tolerances, e.g. within +/−5% or +/−2% of the respective dimension of the magnet (e.g. Rs1 or Rs3). The center of the magnet in case of a homogeneous magnetization may correspond to the geometric center (centroid) of the magnet, which in case of rotational symmetry of the magnet around axis 25 in on the symmetry axis. In case of inhomogeneous magnetization, the magnetization distribution may be additionally taken into account when determining the center, somewhat similar to similar to taking density distributions into account when determining the center of mass of an object.

Figure 3:
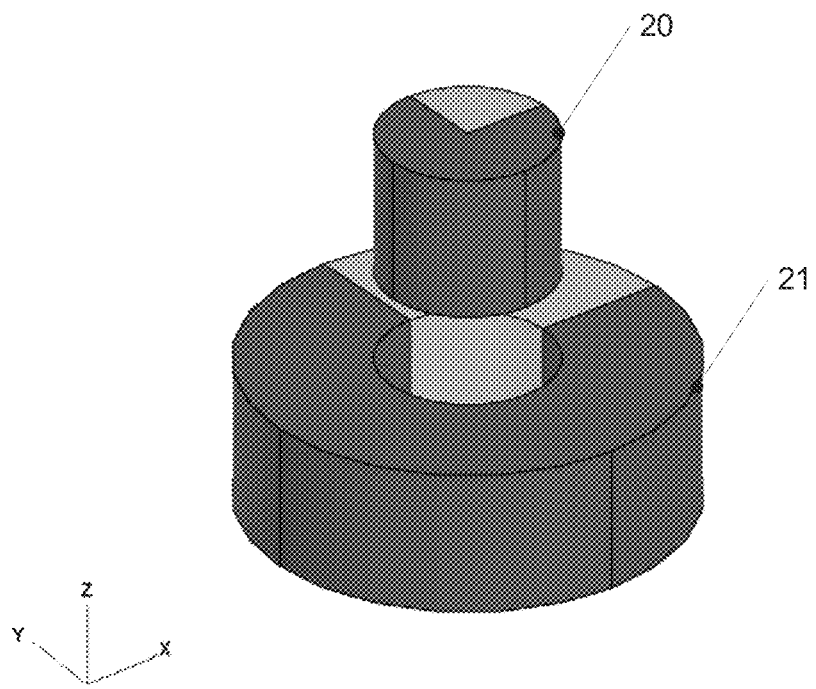
FIG. 3 is a perspective view of a magnet arrangement according to an embodiment.

FIG. 3 illustrates an example perspective view of the magnet arrangements of FIG. 2A, with the first magnet in tablet shape and second magnet 21 in ring shape. Other concentric shapes about the z-axis are also possible, such that the arrangement of FIG. 3 is merely an example.

Just to give some example dimensions, in some embodiments a remanence of first and second magnets 20, 21 may be between 200 mT and 1000 mT, the distance y0 may be between 0.2 and 3 mm, H1 and H2 may be between 2 and 15 mm, Rs1 and Rs2 may be between 1 and 10 mm, Rs3 may be between 5 and 15 mm and G may be between 1 and 10 mm. However, these ranges are merely examples, and depending on the application other values may apply.

Figure 4:
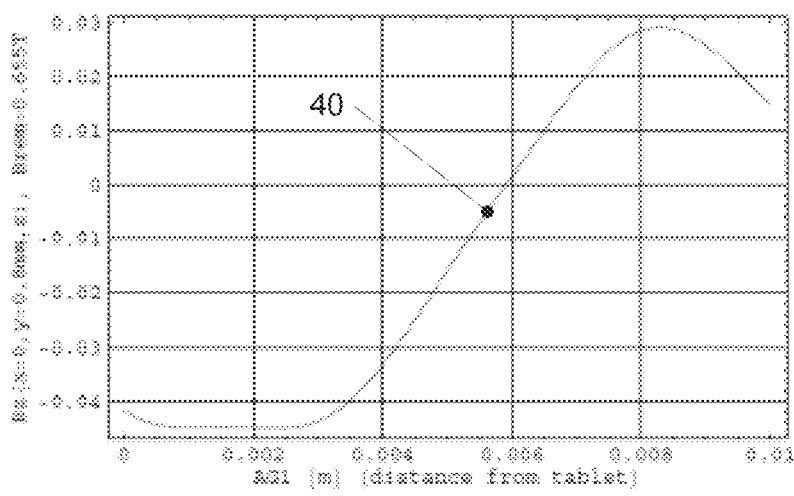
FIG. 4 is a diagram illustrating properties of a magnet arrangement according to an embodiment.

FIG. 4 shows a simulation result for a particular set of values. Again, this is only given for further explanation and illustration, and in particular values are not to be construed as limiting. A curve 40 in FIG. 4 illustrates the Bz component of the magnetic field over AG1 for the following parameters: remanence of first and second magnets 20, 21=655 mT, y0=0.8 mm, H1=H2=5 mm, Rs1=Rs2=3 mm, Rs3=7.5 mm, G=3.2 mm. As can be seen, there is a rather broad plateau around AG1=1.6 mm (=G/2) with a comparatively large field of −45 mT. Therefore, a comparatively large region for AG1 where the first and second derivatives of Bz are at least close to 0 may be created, thus mitigating an influence of assembly tolerances, in particular tolerances regarding the sensor position in z-direction, i.e. regarding AG1.

In a magnet arrangement as shown in FIGS. 2A and 2B, first and second magnets 20, 21 (the following explanations also apply to magnets 20', 21' of FIG. 2B) are provided in a fixed relative position. For example, a plastic part (not shown in FIG. 2) which bridges both magnets 20, 21 to hold them together, for example like a brace, may be provided. Such a plastic part may be provided in a first manufacturing step by molding, and both magnets may be injection molded in a second step, or the magnets may be glued to the plastic parts. In embodiments, both magnets 20, 21 may be magnetized simultaneously after they have been attached to the plastic part, which ensures that their magnetization (arrows 22, 23 in FIG. 3) are in the same direction. In other embodiments, the magnets may be magnetized beforehand.

Instead of a plastic material, any other material may be used which is not soft magnetic. A soft magnetic material is one with a relative permeability larger than 100. Such a soft magnetic brace that holds both magnets would short a significant portion of the magnetic flux of both magnets so that the magnetic field at the sensor location would be unfavorably small. In embodiments, a material the relative permeability μr of which is close to 1 (for example 1±5%) may be used. In other embodiments, μr may for example be in a range from 0.9 to 10 or in a range from 0.8 to 100. So for instance in some embodiments a thin-walled stainless steel sleeve is provided to attach both magnets thereto and to provide coupling to a shaft. The advantage of such a steel sleeve is that it can be manufactured with high accuracy and it is elastic and not brittle so that tight fittings from the sleeve to the magnets and to the shaft are possible.

In embodiments, a material with poor electrical conductivity may be used for bridging magnets 20, 21, to reduce eddy currents during the magnetization procedure of the magnets. However, even with good conductors eddy currents may be kept below critical values by shaping the component coupling the magnets accordingly, for example using a thin-walled form, to avoid large closed current loops around the diametrical magnetization direction.

Figure 5:
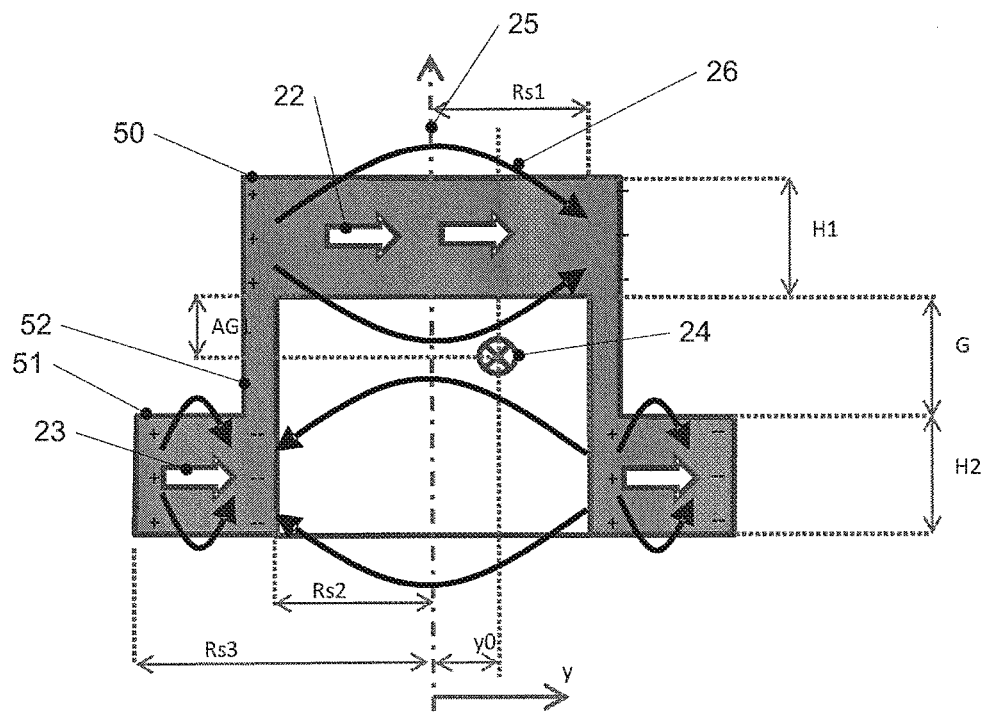
FIG. 5 is a cross-sectional view of a magnet arrangement according to a further embodiment.

In other embodiments, a magnet arrangement may be provided as a single piece, which may for example be molded (e.g. injection molded). A corresponding example embodiment is illustrated in FIG. 5. Compared to the embodiment of FIG. 2, elements bearing the same reference numeral correspond to the elements of FIG. 2 and will not be described again in detail.

In the embodiment of FIG. 5, a first magnet portion 50 and a second magnet portion 51 are provided which may be shaped and magnetized as explained for first magnet 20 and second magnet 21 of FIG. 2. In contrast to FIG. 2, in the embodiment of FIG. 5 first and second magnet portions 50, 51 are not separate magnets, but are linked by a third magnet portion 52. Third magnet portion 52 may be a ring shaped magnet portion, with a thickness considerably thinner than the one of second magnet portion 51, i.e. considerably smaller than Rs3−Rs2, for example at least 3 time smaller, at least 4 times smaller or at least 5 times smaller. In embodiments, third magnet portion 52 is made as thin as structural stability considerations allow. As third magnet portion 52 is thin, magnetic charges (north poles and south poles) are close to each other, such that their contribution to the overall field is negligible, as north and south pole contributions near sensor location 24 essentially cancel each other out. Otherwise, regarding effects, dimensioning etc., the embodiment of FIG. 5 corresponds to the embodiment of FIG. 2. The geometry of FIG. 5 lends itself for an injection molding manufacturing of the part in a single mold step, although other manufacturing methods may also be used.

In the embodiments discussed, the sensor location 24 is between the first magnet portion (20, 50) and the second magnet portion (for example 21, 51). In embodiments, a shaft is coupled to the magnet arrangement on a side of first magnet portion (for example 20, 50), while a sensor arrangement is inserted through a bore or hollow part (within radius Rs2 in the embodiment shown) through the second magnet portion (for example 21, 51). Therefore, the second magnet portion may surround a part of the sensor module which holds the sensor in place. This surrounding may also give some environmental protection for the sensor.

Figure 6:
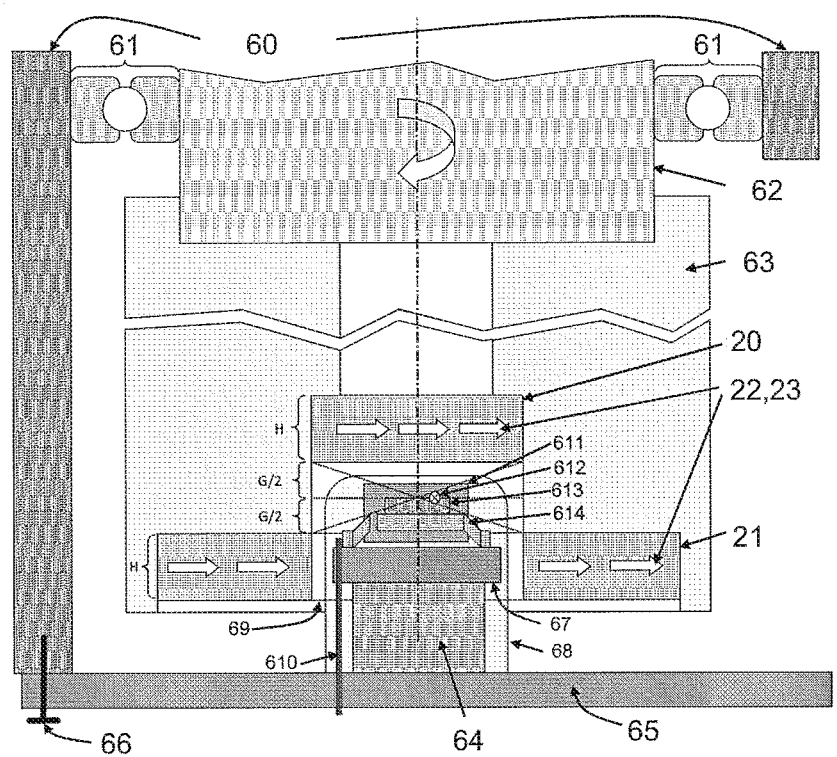
FIG. 6 is a view illustrating a sensor device according to an embodiment.

An example configuration of a magnetic angle sensor device using a magnet arrangement as discussed above is illustrated in FIG. 6. While FIG. 6 contains numerous details, FIG. 6 is merely an example how a magnetic angle sensor device may be configured, and other configurations may also be used. The device of FIG. 6 employs the magnet arrangement of FIG. 2 with a first magnet 20 and a second magnet 21, which are magnetized in a same diametrical direction 22, 23 as explained with reference to FIG. 2. In other embodiments, also other magnet arrangements, for example the magnet arrangement discussed with reference to FIG. 5, may be used.

Magnets 20, 21 are mounted to a rotatable shaft 62 using a magnet holder 63. Shaft 62 is held in a rotatable manner in a static reference frame 60 using bearings 61, for example ball bearings, although other bearings may equally be used. Magnet holder 63 in an embodiment is a non-magnetic material (relative permeability μr=1), for example a plastic material, but is not limited thereto. Magnets 20, 21 may for example be glued to magnet holder 63 or affixed to magnet holder 63 by any other fixing means. As explained previously, magnets 20, 21 may be first mounted to magnet holder 63 and then magnetized, which ensures a good matching of the magnetization directions of magnets 20, 21.

In the embodiment of FIG. 6, a sensor arrangement 611-614, 67 is mounted on a mounting post 64, which in turn is provided on a printed circuit board 65. The sensor arrangement comprises a sensor package mounted to a printed circuit board 67. Numeral 612 denotes a sensor element, 613 denotes a chip die on which sensor element 612 is formed, and 614 denotes a lead frame. 611 is a mold material (package material) packaging the sensor device. While a single sensor element 612 is illustrated in FIG. 6, in embodiments a plurality of sensor elements, for example at least three sensor elements, arranged in a circular manner as shown in FIG. 1 may be employed. Printed circuit board 65 is fixed to reference frame 60 via some fixing means, for example a screw 66.

Lead frame 614 is contacted via printed circuit board 67 and electrical connections 610, such that sensor element 612 may be read out. Numeral 68 denotes a protective cover surrounding the sensor arrangement and mounting post 64. A clearance 69 is provided between protective cover 68 and magnet 21/magnet holder 63 to enable rotation of the magnet arrangement when shaft 62 rotates.

In case lead frame 614 provides long enough connections, in some embodiments printed circuit board 67 may also be omitted. On printed circuit board 65, further electrical components may be provided evaluating sensor signals delivered from sensor element 612 via electrical connections 610.

In other embodiments, depending on the size of the sensor packaged and mold body, also mounting post 64 may be omitted, as long as sensor element 612 is placed in the appropriate position between first magnet 20 and second magnet 21.

For example, in the embodiment shown, the heights H of first magnet 20 and second magnet 21 are the same (corresponding to H1=H2 in FIG. 2), which leads to sensor element 612 being placed halfway between the magnets (AG1=G/2 in FIG. 2).

In the embodiment of FIG. 6, the axial center of the magnetic field generated by magnets 20, 21 is the axial position along the direction of the rotation axis, where the axial field component of the first magnet 20 is equally strong to the axial field component of the second magnet 21.

FIG. 7 is a flowchart illustrating a method according to an embodiment, which may be used to manufacture magnet arrangements and devices as discussed above. While the method of FIG. 7 is independent of the previously described embodiments, all the variations, modifications, features etc. of the previously described embodiments may also be applied to the method of FIG. 7 and will therefore not be repeated in detail. While the method of FIG. 7 will be described as a series of acts or events, the order in which the acts or events are described is not to be construed as limiting.

At 70, a first magnet portion is provided, and at 71, a second magnet portion is provided. First and second magnet portions may be provided as separate magnets like magnets 20, 21 in the embodiment of FIG. 2, or may be provided as magnet portions of a single magnet as in the embodiment of FIG. 5.

At 72, the first and second magnet portions are mounted to a rotatable shaft, like shaft 62 of FIG. 6 or shaft 10 of FIG. 1. At 73, a sensor arrangement is provided between the first and second magnet portions, for example a sensor arrangement comprising Hall plates or MAG-FETs. Providing the sensor arrangement may be performed using a mounting post as discussed with reference to FIG. 6. Other arrangements are also possible.

While specific forms of magnets have been discussed above, these forms are not to be construed as limiting. For example, as already discussed to some extent with reference to FIG. 2A, first magnet portion (for example 20, 50) may have a tapered, conical outer surface in contrast to the straight surface shown in the figures. In some embodiments, the first magnet portion may have a small bore in the center, as long as its diameter is sufficiently small, for example at least five times smaller than the bore of the second magnet portion 21, 51. Also the second magnet portions may have tapered, conical inner and/or outer surfaces. In some embodiments, tapering may be beneficial for manufacturing the magnet portions, for example for easy release of the magnet portions out of a mold tool, or to facilitate assembly with centering.

In embodiments (as shown for example in FIG. 3), the first and second magnet portions have a rotational symmetric shape. In other embodiments, cross sections of the first and second magnets in planes perpendicular to the rotation axis (z-axis) may be a regular shape with an N-fold symmetry, for example with N≥2, for example a pentagon (N=5), a hexagon (N=6), an octagon (N=8) etc. The higher N is, the more the cross sections resemble a circle or a ring as in FIG. 3.

As explained above, the first and second magnets may be attached to a magnet holder (see FIG. 6) for example by gluing. In other embodiments, some specific attachment means may be provided, for example plastic parts, which may be used to attach the magnets to a rotatable shaft.

As can be seen, various modifications and alterations are possible without departing from the scope of the present application. Therefore, it is clear that the above embodiments serve illustrative purposes only and are not to be construed as limiting in any way.

What is claimed is:

1. A magnet arrangement configured to be rotatable about an axis, comprising:
   a first magnet portion, a center of the first magnet portion being essentially on the axis,
   a second magnet portion spaced apart from the first magnet portion in a direction of the axis, a center of the second magnet portion being essentially on the axis, the second magnet portion comprising a central bore.

2. The magnet arrangement of claim 1, wherein the first magnet portion has an N-fold rotational symmetry, with N equal to or greater than 2, with respect to the axis or is rotationally symmetric with respect to the axis.

3. The magnet arrangement of claim 1, wherein the first magnet portion has a cylindrical shape, a tapered conical shape or a mixture thereof.

4. The magnet arrangement of claim 1, wherein the second magnet portion has an M-fold rotational symmetry, M being equal to or greater than 2, with respect to the axis or is rotationally symmetric with respect to the axis.

5. The magnet arrangement of claim 1, wherein the second magnet portion is ring-shaped.

6. The magnet arrangement of claim 1, wherein the first magnet portion and the second magnet portion are provided as separate magnets.

7. The magnet arrangement of claim 6, wherein the first magnet portion and second magnet portion are linked by a linking portion having a relative permeability below 100.

8. The magnet arrangement of claim 7, wherein the first magnet portion and/or the second magnet portion comprises a fixing element for fixing the first magnet portion and/or the second magnet portion to the linking portion.

9. The magnet arrangement of claim 1, wherein the first magnet portion and the second magnet portion are linked by a third magnet portion.

10. The magnet arrangement of claim 9, wherein a thickness of the third magnet portion in a direction perpendicular to the axis is at least three times smaller than a thickness of the first magnet portion and a thickness of the second magnet portion.

11. The magnet arrangement of claim 1, wherein a height of the first magnet portion in the direction of the axis is substantially the same as or between 1 and 1.3 times a height of the second magnet portion in the direction of the axis.

12. The magnet arrangement of claim 1, wherein the central bore of the second magnet portion has essentially a same shape and 85% to 105% of a diametrical size as the first magnet portion.

13. The magnet arrangement of claim 1, wherein the first magnet portion is a made of a same material as the second magnet portion.

14. The magnet arrangement of claim 1, wherein the first magnet portion and the second magnet portion are magnetized essentially in a same direction perpendicular to the axis.

15. A magnetic angle sensor device, comprising:
   the magnet arrangement of claim 1, and
   a magnet sensor arrangement placed between the first magnet portion and the second magnet portion.

16. The device of claim 15, wherein the magnet sensor arrangement comprises at least three sensor elements spaced apart from each other around the axis.

17. The device of claim 16, wherein the at least three sensor elements are sensitive to a magnetic field in a direction parallel to the axis.

18. The device of claim 15, wherein the magnet sensor arrangement is mounted on a mounting post extending through the bore of the second magnet portion.

19. The device of claim 15, further comprising a rotatable shaft, the magnet arrangement being mounted to the shaft.

20. The device of claim 19, wherein the first magnet portion and the second magnet portion are mounted to a magnet holder, wherein the magnet holder is mounted to the shaft.

21. The device of claim 19, wherein the first magnet portion is closer to the shaft than the second magnet portion.

22. A method, comprising:
   providing a first magnet portion,
   providing a second magnet portion spaced apart from the first magnet portion, the second magnet portion having a bore,
   mounting the first magnet portion and the second magnet portion to a rotatable shaft such that centers of the first magnet portion and the second magnet portion are essentially on a rotation axis of the shaft, the first magnet portion and the second magnet portion being spaced apart in direction of the rotation axis, and
   providing a sensor arrangement between the first magnet portion and the second magnet portion.

23. The method of claim 22, further comprising magnetizing the first magnet portion and the second magnet portion after mounting the first magnet portion and the second magnet portion to an element coupling the first magnet portion and the second magnet portion.

24. The method of claim 22, wherein providing the sensor arrangement comprises introducing the sensor arrangement through the bore of the second magnet portion.

25. The method of claim 22, wherein providing the first magnet portion and/or the second magnet portion comprises injection molding of the first magnet portion and/or the second magnet portion.

* * * * *